(12) United States Patent
Zhang et al.

(10) Patent No.: US 11,016,371 B2
(45) Date of Patent: May 25, 2021

(54) GIMBAL AND PHOTOGRAPHING ASSEMBLY HAVING THE GIMBAL

(71) Applicant: AUTEL ROBOTICS CO., LTD., Guangdong (CN)

(72) Inventors: Zhengli Zhang, Guangdong (CN); Songtao Chang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 16/722,152

(22) Filed: Dec. 20, 2019

(65) Prior Publication Data
US 2020/0124949 A1 Apr. 23, 2020

Related U.S. Application Data

(63) Continuation of application No. PCT/CN2018/079600, filed on Mar. 20, 2018.

(51) Int. Cl.
*G03B 17/56* (2021.01)

(52) U.S. Cl.
CPC ......... *G03B 17/563* (2013.01); *G03B 17/566* (2013.01); *G03B 2217/002* (2013.01)

(58) Field of Classification Search
CPC ...... G03B 17/00; G03B 17/56; G03B 17/561; G03B 17/563; G03B 17/566; G03B 2217/002; F16M 13/04; F16M 13/005
USPC ................ 396/421, 424; 248/187.1
See application file for complete search history.

(56) References Cited

U.S. PATENT DOCUMENTS

| | | | |
|---|---|---|---|
| 2010/0264283 | A1 | 10/2010 | Stoffel et al. |
| 2016/0083110 | A1* | 3/2016 | Pan ............ F16M 11/12 348/144 |
| 2017/0064176 | A1 | 3/2017 | Kim |
| 2017/0227162 | A1* | 8/2017 | Saika ........... B64D 47/08 |
| 2017/0336018 | A1* | 11/2017 | Xie ............. F16M 13/02 |

FOREIGN PATENT DOCUMENTS

| | | |
|---|---|---|
| CN | 201429762 Y | 3/2010 |
| CN | 204420520 U | 6/2015 |
| CN | 205606108 U | 9/2016 |
| CN | 205610770 U | 9/2016 |
| CN | 205746966 U | 11/2016 |
| FR | 3029264 A1 | 6/2016 |
| WO | 2016082770 A1 | 2/2016 |
| WO | 2017024476 A1 | 2/2017 |

OTHER PUBLICATIONS

European Search Report Application No. 18819600.0; dated Jun. 8, 2020.

* cited by examiner

*Primary Examiner* — Clayton E. LaBalle
*Assistant Examiner* — Fang-Chi Chang

(57) ABSTRACT

The present application relates to the technical field of a photographing apparatus, provides a gimbal and a photographing assembly having the gimbal. The gimbal includes: a stability augmentation assembly configured to mount the photographing apparatus; a handle connected to the stability augmentation assembly; a display screen mounted to the handle and configured to display an image photographed by the photographing apparatus, so that a user may control the stability augmentation assembly according to the photographed image.

10 Claims, 4 Drawing Sheets

GIMBAL AND PHOTOGRAPHING ASSEMBLY HAVING THE GIMBAL

This application is a continuation of International Patent Application. No. PCT/CN2018/079600 filed on Mar. 20, 2018, which claims priority to Chinese Patent Application No. 201720724189.8 filed on Jun. 20, 2017, both of which are incorporated by reference herein in their entireties.

BACKGROUND

Technical Field

The present application relates to the technical field of a photographing apparatus, and in particular, to a gimbal and a photographing assembly having the gimbal.

Related Art

A gimbal is a supporting device for mounting and fixing a camera. The gimbal is divided into two types: a fixed gimbal and an electric gimbal. The fixed gimbal applies to a small range of monitoring. After the camera is mounted to the fixed gimbal, a horizontal angle and a pitch angle of the camera may be adjusted. An adjusting mechanism is locked after the camera reaches a best working attitude. The electric gimbal applies to a large range of scanning and monitoring, which may enlarge a monitoring range of the camera.

During implementation of the present application, an inventor finds that at least the following problems exist in the prior art: in an existing handheld gimbal, a control button is only disposed on a handle for controlling an attitude of an image acquisition apparatus carried to the handheld gimbal (for example, changing a height, a tilt angle and/or a direction of the image acquisition apparatus). Because there is no display screen to display a currently photographed image or video in real time, it is impossible to know whether the currently photographed image or video meets demands of a user, and the user cannot adjust the attitude of the image acquisition apparatus according to the currently photographed image or video, to cause the image acquisition apparatus to obtain, through photographing, an image or video that completely meets the demands of the user.

SUMMARY

In order to resolve the foregoing technical problems, an embodiment of the present application provides a handheld gimbal on which a touch display screen is disposed and a photographing assembly having the gimbal.

In order to resolve the foregoing technical problems, an embodiment of the present application provides the following technical solution:

a gimbal that is configured to carry a photographing apparatus is provided, the gimbal includes: a stability augmentation assembly configured to mount the photographing apparatus; a handle connected to the stabilizing assembly; a display screen fixedly mounted to the handle and configured to display an image photographed by the photographing apparatus, so that a user may control the stability augmentation assembly according to the photographed image.

In some embodiments, the display screen is a touch display screen configured to display the image photographed by the photographing apparatus and receive an operation instruction input by the user.

In some embodiments, the touch display screen includes a processor, the processor being electrically connected to the stability augmentation assembly, and the processor being configured to process the operation instruction to send an electrical signal that controls the stability augmentation assembly.

In some embodiments, the gimbal further includes an electronic speed controller, the electronic speed controller being electrically connected to the processor and the stability augmentation assembly respectively; the processor sending the electrical signal to the electronic speed controller, and controlling an operation state of the stability augmentation assembly through the electronic speed controller.

In some embodiments, the stability augmentation assembly is fixedly connected to an end face of an end of the handle, and the touch display screen is mounted to a side of an end of the handle.

In some embodiments, the stability augmentation assembly includes: a first rotating member including a first rotating portion; and a second rotating member including a first connecting arm, a second fixing portion and a second rotating portion that may rotate relative to the second fixing portion, the first connecting arm being fixedly connected between the first rotating portion and the second fixing portion.

In some embodiments; the first rotating member includes a first fixing portion and a first rotating shaft, the first rotating portion rotating about the first rotating shaft relative to the first fixing portion; and the second rotating member includes a second rotating shaft, the second rotating portion rotating about the second rotating shaft relative to the second fixing portion.

In some embodiments, the first rotating shaft and the second rotating shaft are perpendicular to each other.

In some embodiments, the stability augmentation assembly includes a third rotating member, the third rotating member includes: a second connecting arm, a third fixing portion, a third rotating portion and a third rotating shaft, the third rotating portion rotating about the third rotating shaft relative to the third fixing portion; and the second connecting arm being fixedly connected between the second rotating portion and the third fixing portion, and the third rotating portion being configured to be fixedly connected to the photographing apparatus and driving the photographing apparatus to rotate relative to the third fixing portion.

In some embodiments; the first rotating shaft, the second rotating shaft and the third rotating shaft are perpendicular to each other.

In order to resolve the foregoing technical problem, an embodiment of the present application further provides the following technical solution:

a photographing assembly is provided, including a photographing apparatus and the foregoing gimbal, the photographing apparatus being mounted at the stability augmentation assembly.

In some embodiments, the photographing apparatus includes a lens module and a housing, the lens module being disposed within the housing; the stability augmentation assembly includes a third rotating member, the third rotating member including a third rotating portion, a third fixing portion and a third rotating shaft, the third rotating portion rotating about the third rotating shaft relative to the third fixing portion, the third rotating portion being configured to be fixedly connected to the lens module and the housing, and an axis of the third rotating shaft overlapping with an optical axis of the lens module.

In some embodiments, the photographing apparatus includes a lens module and a housing, the lens module being disposed within the housing; the stability augmentation assembly includes a third rotating member, the third rotating member including a third rotating portion, a third fixing portion and a third rotating shaft, the third rotating portion rotating about the third rotating shaft relative to the third fixing portion, the third rotating portion being configured to be fixedly connected to the lens module, the third fixing portion being configured to be fixedly connected to the housing, and an axis of the third rotating shaft overlapping with an optical axis of the lens module.

In some embodiments, the third fixing portion is sleeved on the lens module, and the third fixing portion is connected to the lens module through a bearing, so that the lens module may rotate relative to the third fixing portion; the third rotating portion is sleeved on the lens module, and the third rotating portion is fixedly connected to the lens module, so that the third rotating portion may drive the lens module to rotate.

In order to resolve the foregoing technical problem, an embodiment of the present application further provides the following technical solution:

a photographing assembly is provided, including a photographing apparatus and the foregoing gimbal, the stability augmentation assembly carrying the photographing apparatus.

Compared with the prior art, the display screen is fixedly mounted to the handle of the gimbal in the embodiment of the present application. The display screen may display a currently photographed image to the user, and the user may adjust an attitude of the stability augmentation assembly according to the currently photographed image, so that the user more accurately controls the attitude of the photographing apparatus. The photographing apparatus obtains, through photographing, an image required by the user, and the display screen is fixedly connected to the handle to improve an integration level of the gimbal.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale. Apparently, the accompanying drawings in the following description show only some embodiments of this application, and a person of ordinary skill in the art may still derive drawings of other embodiments from these accompanying drawings without creative efforts.

DETAILED DESCRIPTION

For ease of understanding this application, this application is described in further detail below with reference to the accompanying drawings and detailed description. It should be noted that an element described as being "fixed" to another element may be directly on the other element, or one or more intervening components may be present. An element described as being "electrically connected" to another element may be directly connected to the other element, or one or more intervening components may be present. As used in the specification, orientation or position relationships indicated by the terms such as "upper", "lower", "inside"; "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application. In addition, the terms such as "first", "second", and "third" are used only for the purpose of description, and should not be understood as indicating or implying relative importance.

Unless otherwise defined, all technical and scientific terms used herein have the same meaning as commonly understood by one of ordinary skill in the art to which this application belongs. In this specification, terms used in the specification of this application are merely intended to describe objectives of the specific embodiments, but are not intended to limit this application. As used herein, the term "and/or" includes any and all combinations of one or more related items listed.

In addition, the technical features provided in different embodiments of this application to be described below may be combined with each other as long as no conflict occurs.

Figure 1:
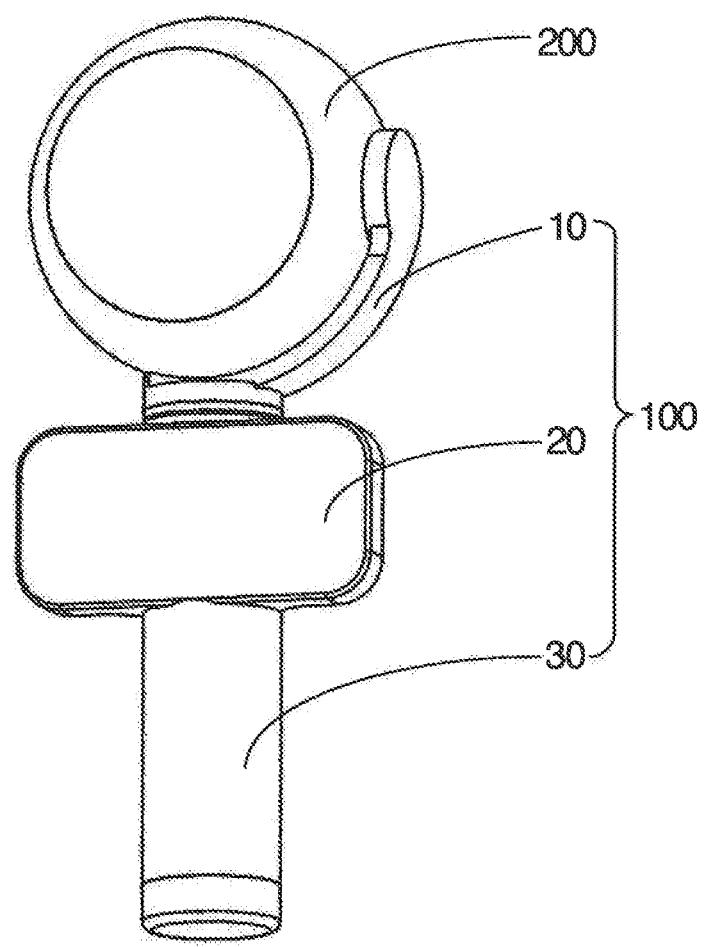
FIG. 1 is a simplified schematic structural diagram of a gimbal and a photographing apparatus according to an embodiment of the present application.
Figure 2:
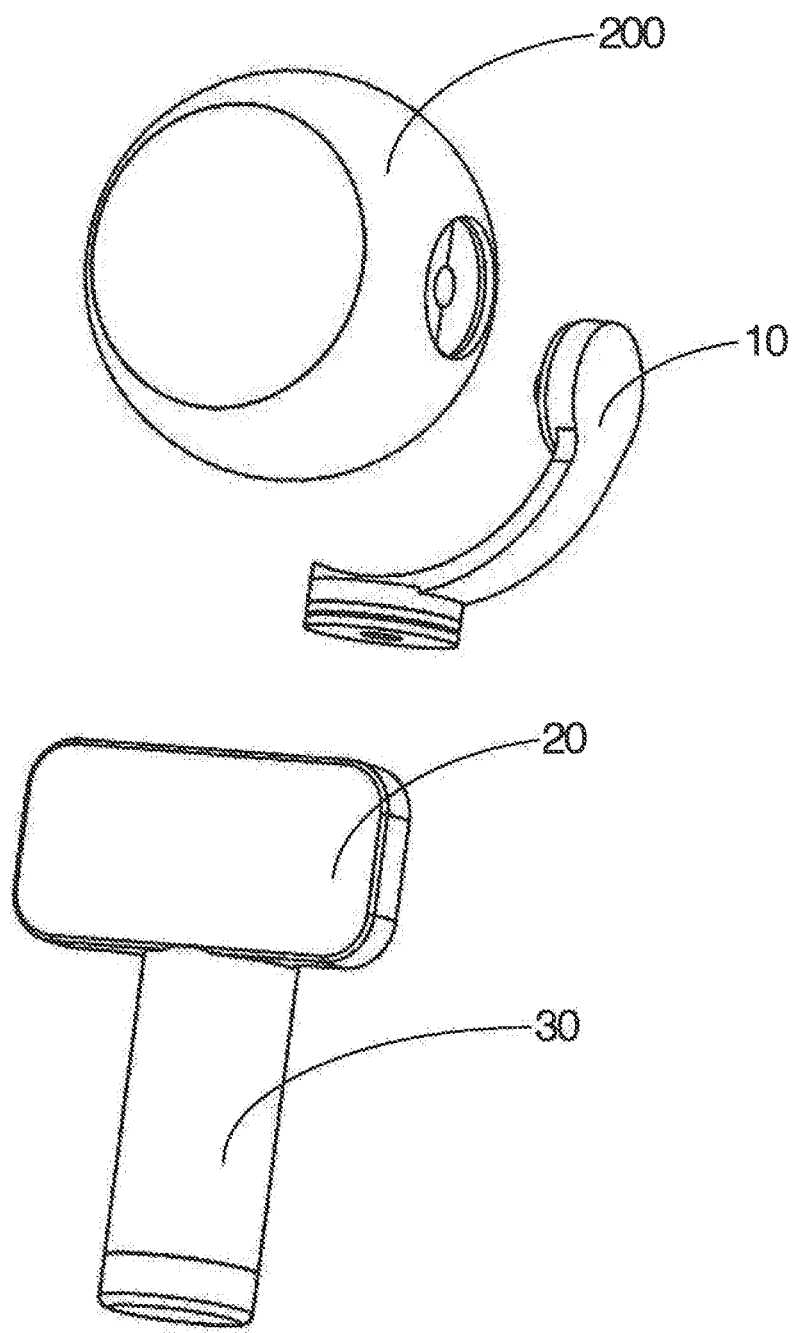
FIG. 2 is another schematic structural diagram of the gimbal and the photographing apparatus shown in FIG. 1.

Referring to FIG. 1 and FIG. 2, an embodiment of the present application provides a gimbal 100 configured to carry a photographing apparatus 200 so as to fix the photographing apparatus 200 or to randomly adjust an attitude of the photographing apparatus 200 (for example, changing a height, a tilt angle and/or a direction of the photographing apparatus 200) and keeping the photographing apparatus 200 at a set attitude. The photographing apparatus 200 may be any image acquisition apparatus, such as a camera, a video camera, a camera lens, etc., or other portable electronic apparatuses, such as a mobile phone and a tablet computer, etc. It may be understood that the photographing apparatus may also be a sensor and the like.

The gimbal 100 includes a stability augmentation assembly 10, a touch display screen 20, and a handle 30 fixedly connected to the stability augmentation assembly 10. The touch display screen 20 is fixedly mounted to the handle 30, and the stability augmentation assembly 10 is configured to mount the photographing apparatus 200.

It may be understood that the touch display screen 20 may also be a general non-touch display screen in other embodiments. The display screen 20 may display an image photographed by the photographing apparatus 200, so that a user may implement a visual operation. For example, the user observes the image photographed by the photographing apparatus 200 through the display screen. When it is considered that a photographing effect may be better if a lens needs to be tilted upwards, the user controls the stability augmentation assembly 10 through a mechanical button on the handle to adjust an attitude of the photographing apparatus 200, so that the user more accurately controls the attitude of the photographing apparatus 200, and the display screen 20 is fixedly connected to the handle, improving an integration level of the gimbal.

Definitely, in this embodiment, the adopted touch display screen 20 not only has a display function, but also has a touch screen input function, to further improve the integration level of the gimbal 100, omit the complex mechanical button, so that the user controls the stability augmentation assembly (10) more conveniently and have a better experience.

In this embodiment, the touch display screen 20 may be fixedly connected to the handle 30 through a certain connection apparatus, or may be integrally formed with the handle 30.

Figure 3:
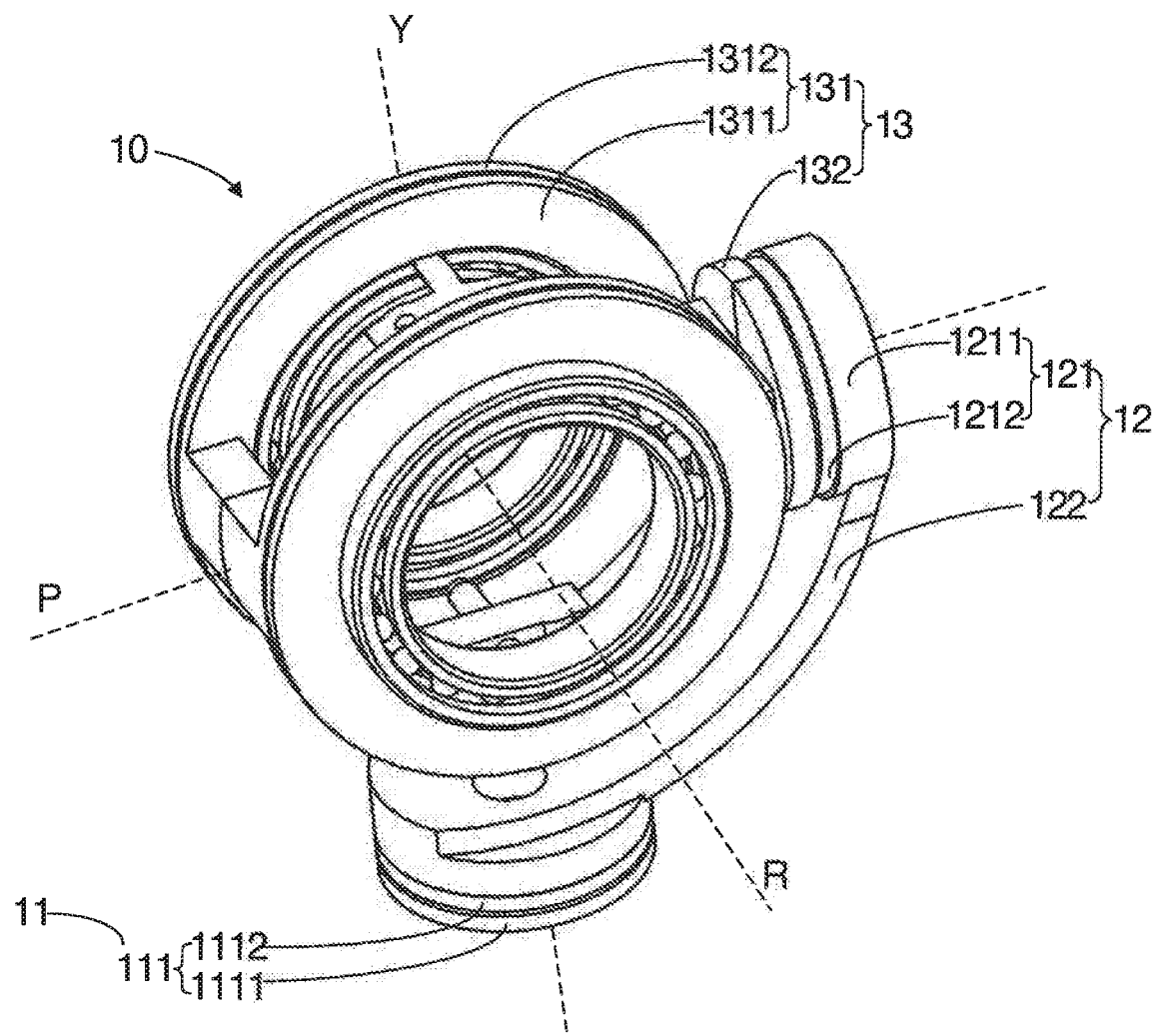
FIG. 3 is a schematic structural diagram of a stability augmentation assembly of the gimbal shown in FIG. 1.

Referring to FIG. 3, in this embodiment, the gimbal 100 is a three-axis omnidirectional gimbal, and the stability augmentation assembly 10 includes a first rotating member 11, a second rotating member 12 and a third rotating member 13. The first rotating member 11 is configured to be mounted to the handle 30, the first rotating member 11 is connected to the second rotating member 12. The third rotating member 13 is connected to the second rotating member 12, and the third rotating member 13 is configured to mount the photographing apparatus 200.

The first rotating member 11, the second rotating member 12 and the third rotating member 13 each include a drive apparatus. Each drive apparatus includes a fixing portion and a rotating portion. The rotating portion may rotate relative to the fixing portion.

It may be understood that, in some other embodiments, the stability augmentation assembly 10 only includes a first rotating member 11 and a second rotating member 12. The first rotating member 11 is configured to be mounted to the handle 30, the first rotating member 11 is connected to the second rotating member 12. The second rotating member 12 is configured to mount the photographing apparatus 200.

In an embodiment of the present application, each drive apparatus of the stability augmentation assembly 10 of the gimbal 100 responds to a received rotation control signal, and controls, according to the control signal, a rotating portion of each drive apparatus to rotate clockwise or counterclockwise relative to a fixing portion of each drive apparatus, and adjusts a rotation speed of the rotating portion, so as to adjust a corresponding direction. Therefore, a direction, an orientation and stability of the photographing apparatus 200 is further controlled. In the foregoing way, the photographing apparatus 200 may obtain a stable video and/or a picture in a corresponding angle of view. It may be understood that the stability augmentation assembly 10 may further include a rotating member that rotates toward one direction, two directions or more directions.

In particular, in this embodiment, the first rotating member 11 includes a first drive apparatus 111. The first drive apparatus 111 includes a first fixing portion 1111, a first rotating portion 1112 and a first rotating shaft (not shown). The first rotating shaft is flexibly connected to the first fixing portion 1111, and the first rotating shaft is fixedly connected to the first rotating portion 1112. The first rotating portion 1112 may rotate about the first rotating shaft relative to the first fixing portion 1111.

In this embodiment, the second rotating member 12 includes a second drive apparatus 121 and a first connecting arm 122. The second drive apparatus 121 includes a second fixing portion 1211, a second rotating portion 1212 and a second rotating shaft (not shown). The second rotating shaft is flexibly connected to the second fixing portion 1211, and the second rotating shaft is fixedly connected to the second rotating portion 1212. The second rotating portion 1212 may rotate about the second rotating shaft relative to the second fixing portion 1211. One end of the first connecting arm 122 is fixedly connected to the first rotating portion 1112, and the other end thereof is fixedly connected to the second fixing portion 1211 of the second drive apparatus 121, so that when the first rotating portion 1112 of the first drive apparatus 111 rotates, the second rotating member 12 may be driven to rotate relative to the first fixing portion 1111 of the first rotating member 11.

In this embodiment, the third rotating member 13 includes a third drive apparatus 131 and a second connecting arm 132. The third drive apparatus 131 includes a third fixing portion 1311 and a third rotating portion 1312. The third rotating portion 1312 may rotate relative to the third fixing portion 1311. One end of the second connecting arm 132 is fixedly connected to the second rotating portion 1212, and the other end thereof is fixedly connected to the third fixing portion 1311 of the third drive apparatus 131, so that when the second rotating portion 1212 of the second drive apparatus 121 rotates, the third rotating member 13 may be driven to rotate relative to the second fixing portion 1211 of the second rotating member 12. The third rotating portion 1312 is fixedly connected to the photographing apparatus 200, and is configured to drive the photographing apparatus 200 to rotate relative to the third fixing portion 1311.

The first drive apparatus 111 and the second drive apparatus 121 may be respectively one of a brushless motor, a brush motor or a pneumatic motor. The first rotating shaft, the second rotating shaft and the third rotating shaft are perpendicular to each other.

Further, in this embodiment, the first rotating member 11 controls the photographing apparatus 200 to rotate about a translation axis or a heading axis (in a Y-axis direction shown in FIG. 3), the second rotating member 12 controls the photographing apparatus 200 to rotate about a pitch axis (in a P-axis direction shown in FIG. 3), and the third rotating member 13 controls the photographing apparatus 200 to rotate about a roll axis (in an R-axis direction shown in FIG. 3).

Figure 4:
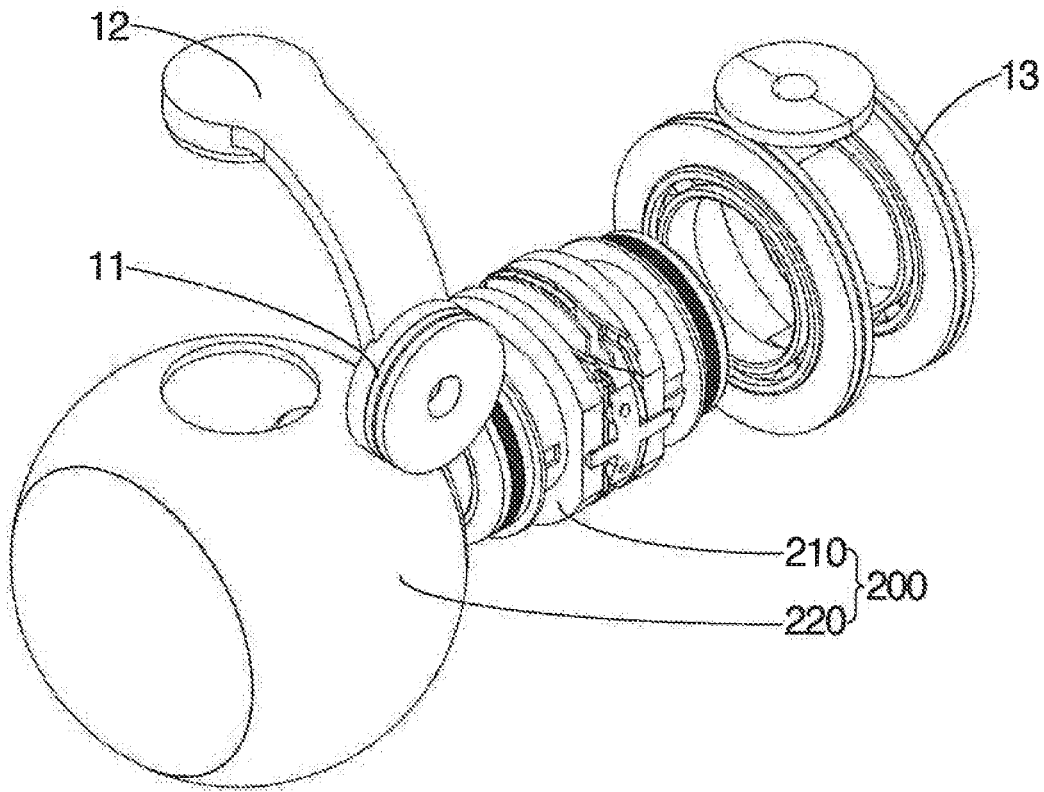
FIG. 4 is a schematic structural diagram of a stability augmentation assembly of the gimbal and the photographing apparatus shown in FIG. 1.

Referring to FIG. 4, in this embodiment, the photographing apparatus 200 includes a lens module 210 and a housing 220. The lens module 210 is disposed within the housing 220, and the lens module 210 is fixedly connected to the housing 220. Both of the third fixing portion 1311 and the third rotating portion 1312 are circular-ring-shaped (that is, the third drive apparatus 131 is a circular-ring-shaped disc-type electric motor). The third fixing portion 1311 is sleeved on the lens module 210, and the third fixing portion 1311 is connected to the lens module 210 through a bearing, so that the lens module 210 may rotate relative to the third fixing portion 1311. The third rotating portion 1312 is sleeved on the lens module 210, and the third rotating portion 1312 is fixedly connected to the lens module 210, so that the third rotating portion 1312 may drive the lens module 210 to rotate. A rotational axis (which is the R axis in this embodiment) of the third drive apparatus 131 overlaps with an optical axis of the lens module 210. The third drive apparatus 131 drives the lens module 210 to rotate about the optical axis of the lens module 210.

It may be understood that, in some other embodiments, the lens module 210 is flexibly connected or not connected to the housing 220, the lens module 210 is fixedly connected to the third rotating portion 1312, and the housing 220 is fixedly connected to the third fixing portion 1311 or the second connecting arm 132. The third drive apparatus 131 drives the lens module 210 to rotate about the optical axis of the lens module 210.

The handle 30 is rod-shaped, the first fixing portion 1111 in the stability augmentation assembly 10 is fixedly connected to an end face of an end of the handle 30, and the touch display screen 20 is mounted to a side of an end of the handle 30.

Figure 5:
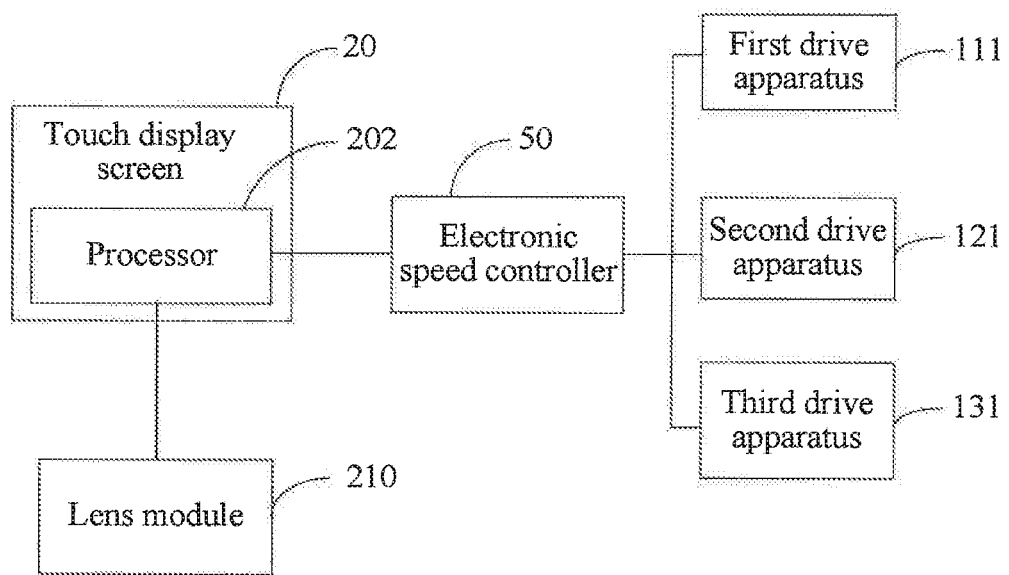
FIG. 5 is a schematic diagram of functional modules of the gimbal shown in FIG. 1.

Referring to FIG. 5, the gimbal 100 further includes an electronic speed controller 50, and the touch display screen 20 includes a processor 202. The processor 202 is electrically connected to the electronic speed controller 50 and the lens module 210 respectively, and the electronic speed controller 50 is electrically connected to the first drive apparatus 111, the second drive apparatus 121 and the third drive apparatus 131 respectively, to control operation states of the first drive apparatus 111, the second drive apparatus 121 and the third drive apparatus 131. The processor 202 is configured to process an image collected by the lens module 210 and control the touch display screen 20 to display image information collected by the lens module 210. A virtual button (not shown) is displayed on the touch display screen 20. A person (that is, a user) using the gimbal 100 may input an operation instruction by touching the virtual button. The processor 202 processes the operation instruction, and sends an electrical signal that controls the stability augmentation assembly 10 to the electronic speed controller 50, so as to control the operation states of the first drive apparatus 111, the second drive apparatus 121 and the third drive apparatus 131 in the stability augmentation assembly 10, further causing the lens module 210 to obtain a stable video and/or an image in a corresponding angle of view.

In the embodiment of the present application, the touch display screen 20 is disposed on the handle 30 of the gimbal 100. The touch display screen 20 may display the currently photographed image to the user. The user may adjust, according to the currently photographed image, the attitude of the stability augmentation assembly 10 through clicking the virtual button disposed on the touch display screen 20, so that the lens module 210 obtains, through photographing, an image required by the user.

It should be finally noted that the above embodiments are merely intended for describing the technical solutions of this application rather than limiting this application. Based on the idea of this application, the technical features in the foregoing embodiments or different embodiments may be combined, the steps may be implemented in any order, and many other changes in the different aspects of this application as described above may exist. For brevity, such changes are not provided in the detailed descriptions. Although this application is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of this application.

What is claimed is:

1. A photographing assembly, comprising: a photographing apparatus and a gimbal, the photographing apparatus being mounted to a stability augmentation assembly; wherein the photographing apparatus comprises a lens module and a housing, the lens module being disposed within the housing; and the stability augmentation assembly comprises a third rotating member, the third rotating member comprising a third rotating portion, a third fixing portion and a third rotating shaft, the third rotating portion rotating about the third rotating shaft relative to the third fixing portion, the third rotating portion being configured to be fixedly connected to the lens module and the housing, and an axis of the third rotating shaft overlapping with an optical axis of the lens module; wherein the third fixing portion is sleeved on the lens module, and the third fixing portion is connected to the lens module through a bearing, so that the lens module is rotatable relative to the third fixing portion; and the third rotating portion is sleeved on the lens module, and the third rotating portion is fixedly connected to the lens module, so that the third rotating portion drives the lens module to rotate; wherein the gimbal comprises: the stability augmentation assembly configured to mount the photographing apparatus; a handle connected to the stability augmentation assembly; and a display screen fixedly mounted to the handle and configured to display an image photographed by the photographing apparatus to enable a user to control the stability augmentation assembly according to the photographed image.

2. The photographing assembly according to claim 1, wherein the display screen is a touch display screen, the touch display screen being configured to display an image photographed by the photographing apparatus and receive an operation instruction input by the user.

3. The photographing assembly according to claim 2, wherein the touch display screen comprises a processor, the processor being electrically connected to the stability augmentation assembly; and
the processor being configured to process the operation instruction to send an electrical signal that controls the stability augmentation assembly.

4. The photographing assembly according to claim 3, wherein the gimbal further comprises an electronic speed controller, the electronic speed controller being electrically connected to the processor and the stability augmentation assembly, respectively; and
the processor sends the electrical signal to the electronic speed controller, and controls an operation state of the stability augmentation assembly through the electronic speed controller.

5. The photographing assembly according to claim 2, wherein the stability augmentation assembly is fixedly connected to an end face of an end of the handle, and the touch display screen is mounted to a side edge of an end of the handle.

6. The photographing assembly according to claim 1, wherein the stability augmentation assembly comprises: a first rotating member comprising a first rotating portion; and a second rotating member comprising a first connecting arm, a second fixing portion and a second rotating portion that is rotatable relative to the second fixing portion, the first connecting arm being fixedly connected between the first rotating portion and the second fixing portion.

7. The photographing assembly according to claim 6, wherein
the first rotating member comprises a first fixing portion and a first rotating shaft, the first rotating portion rotating about the first rotating shaft relative to the first fixing portion; and
the second rotating member comprises a second rotating shaft, the second rotating portion rotating about the second rotating shaft relative to the second fixing portion.

8. The photographing assembly according to claim 7, wherein the first rotating shaft and the second rotating shaft are perpendicular to each other.

9. The photographing assembly according to claim 7, wherein
the stability augmentation assembly comprises a third rotating member, the third rotating member comprising: a second connecting arm, a third fixing portion, a third rotating portion and a third rotating shaft, the third rotating portion rotating about the third rotating shaft relative to the third fixing portion; and the second connecting arm being fixedly connected between the second rotating portion and the third fixing portion, and the third rotating portion being configured to be fixedly connected to the photographing apparatus and driving the photographing apparatus to rotate relative to the third fixing portion.

10. The photographing assembly according to claim 9, wherein the first rotating shaft, the second rotating shaft and the third rotating shaft are perpendicular to each other.

* * * * *